US008161035B2

(12) United States Patent
Zhang et al.

(10) Patent No.: US 8,161,035 B2
(45) Date of Patent: Apr. 17, 2012

(54) QUERY OPTIMIZATION BY SPECIFYING PATH-BASED PREDICATE EVALUATION IN A PATH-BASED QUERY OPERATOR

(75) Inventors: Ning Zhang, Palo Alto, CA (US); Sam Idicula, Santa Clara, CA (US); Balasubramanyam Sthanikam, Foster City, CA (US); Nipun Agarwal, Santa Clara, CA (US)

(73) Assignee: Oracle International Corporation, Red Shores, CA (US)

( * ) Notice: Subject to any disclaimer, the term of this patent is extended or adjusted under 35 U.S.C. 154(b) by 209 days.

(21) Appl. No.: 12/478,147

(22) Filed: Jun. 4, 2009

(65) Prior Publication Data
US 2010/0312756 A1 Dec. 9, 2010

(51) Int. Cl.
*G06F 17/30* (2006.01)
(52) U.S. Cl. .......................................... 707/713; 707/736
(58) Field of Classification Search .................. 707/713, 707/736
See application file for complete search history.

(56) References Cited

U.S. PATENT DOCUMENTS

| 7,165,063 | B2* | 1/2007 | Beyer et al. ............................. 1/1 |
| 7,756,858 | B2 | 7/2010 | Lindblad et al. |
| 7,840,547 | B1* | 11/2010 | Tucker et al. ................. 707/706 |
| 7,870,124 | B2 | 1/2011 | Liu et al. |
| 7,882,089 | B1 | 2/2011 | Levy |
| 7,921,129 | B2 | 4/2011 | Madan et al. |
| 2003/0167258 | A1* | 9/2003 | Koo et al. ........................... 707/2 |
| 2004/0148420 | A1 | 7/2004 | Hinshaw et al. |
| 2004/0205082 | A1 | 10/2004 | Fontoura et al. |
| 2005/0097084 | A1* | 5/2005 | Balmin et al. .................... 707/3 |
| 2005/0108209 | A1* | 5/2005 | Beyer et al. ........................ 707/3 |
| 2006/0026113 | A1 | 2/2006 | Omoigui |
| 2007/0011184 | A1 | 1/2007 | Morris et al. |
| 2007/0076936 | A1 | 4/2007 | Li et al. |
| 2007/0130110 | A1 | 6/2007 | Graefe et al. |
| 2007/0162426 | A1* | 7/2007 | Brown et al. ....................... 707/2 |
| 2007/0168324 | A1* | 7/2007 | Grabs et al. ........................ 707/2 |
| 2007/0233645 | A1* | 10/2007 | Peterson et al. .................... 707/3 |
| 2007/0276825 | A1* | 11/2007 | Dettinger et al. ................. 707/6 |
| 2007/0276835 | A1* | 11/2007 | Murthy ............................. 707/9 |

(Continued)

OTHER PUBLICATIONS

Hemel et al. "Code Generation by Model Transformation a Case Study in Transformation Modularity," Theory and Practice of Model Transformations Lecture Notes in Computer Science, 2008, vol. 5063/2008, 183-198.*

(Continued)

*Primary Examiner* — Robert Timblin
*Assistant Examiner* — Richard Bowen
(74) *Attorney, Agent, or Firm* — Hickman Palermo Truong Becker Bingham & Wong LLP

(57) ABSTRACT

The approaches described herein provide an efficient way for a database server to process certain kinds of queries over XML data stored in an object-relational database that require the evaluation of a predicate expression with one or more path-based operands. A predicate expression part of a XQuery or SQL WHERE clause that returns a boolean value. A database server first determines whether the query qualifies for this particular kind of optimization, then rewrites the query using an enhanced query operator syntax for specifying the predicate expression to be evaluated. The enhanced query operator subsumes the work of a second path-based query operator, resulting in the suppression of the WHERE EXISTS subquery. The rewritten query operator is used to generate a query execution plan that provides for several query execution optimizations.

18 Claims, 5 Drawing Sheets

U.S. PATENT DOCUMENTS

| | | | |
|---|---|---|---|
| 2007/0299834 A1* | 12/2007 | Liu et al. | 707/4 |
| 2008/0065674 A1* | 3/2008 | Liu et al. | 707/102 |
| 2008/0114803 A1* | 5/2008 | Chinchwadkar et al. | 707/102 |
| 2008/0120283 A1 | 5/2008 | Liu et al. | |
| 2008/0172353 A1* | 7/2008 | Lim et al. | 706/47 |
| 2008/0222101 A1* | 9/2008 | Beyer et al. | 707/3 |
| 2008/0222123 A1* | 9/2008 | Colby et al. | 707/4 |
| 2009/0070313 A1* | 3/2009 | Beyer et al. | 707/5 |
| 2009/0100004 A1 | 4/2009 | Andrei et al. | |
| 2009/0125480 A1* | 5/2009 | Zhang et al. | 707/2 |
| 2009/0210383 A1* | 8/2009 | Seemann | 707/3 |
| 2009/0259641 A1* | 10/2009 | Balmin et al. | 707/4 |
| 2009/0287670 A1* | 11/2009 | Hou et al. | 707/4 |
| 2010/0293199 A1 | 11/2010 | Sthanikam et al. | |
| 2010/0299327 A1* | 11/2010 | Kiefer et al. | 707/736 |
| 2010/0306219 A1 | 12/2010 | Stahnikam et al. | |
| 2010/0306220 A1 | 12/2010 | Stanikam et al. | |

OTHER PUBLICATIONS

Zhang et al. "Honey, I Shrunk the XQuery!—An XML Algebra Optimization Approach," WIDM '02, Nov. 8, 2002, ACM, pp. 15-22.*

U.S. Appl. No. 12/467,984, filed May 18, 2009, Office Action, mailed Jun. 13, 2011.

U.S. Appl. No. 12/474,133, filed May 28, 2009, Office Action, mailed Jun. 22, 2011.

U.S. Appl. No. 12/474,124, filed May 28, 2009, Office Action, mailed Jun. 24, 2011.

* cited by examiner

```
SELECT SYS_IXQAGG (
    SELECT P.C0
    FROM XPATHTABLE ('site/closed_auctions/closed_auction'
            PASSING XMARK.XMLDATA
            COLUMNS C0 XMLTYPE PATH '.') P,          220
        XPATHTABLE ('/closed_auction/price'
            PASSING P.C0
            COLUMNS C0 XMLTYPE PATH '/text()') P1    210
    WHERE P1.C0 >= 40  ◀—230
) FROM "XMARK"."XMARK_CSX" "XMARK"
```

FIG. 2

```
SELECT SYS_IXQAGG (
  SELECT P.C0
  FROM XPATHTABLE('site/closed_auctions/closed_auction'
       PASSING XMARK.XMLDATA
       COLUMNS C0 XMLTYPE PATH '.',
                C1 PREDICATE PATH '[./price/text() >= 40']
                                   ──────────420──────────
       ─────────────────410─────────────────
  ) P
) FROM "XMARK"."XMARK_CSX" "XMARK"
```

FIG. 4

QUERY OPTIMIZATION BY SPECIFYING PATH-BASED PREDICATE EVALUATION IN A PATH-BASED QUERY OPERATOR

CROSS-REFERENCE TO RELATED APPLICATIONS; BENEFIT CLAIM

This application is related to U.S. patent application Ser. No. 11/182,997 filed on Jul. 14, 2005, entitled "Encoding Of Hierarchically Organized Data For Efficient Storage And Processing;" U.S. patent application Ser. No. 12/474,124 filed on May 28, 2009 entitled "Cache-Based Predicate Handling For Queries On XML Data Using Uncorrelated Path-Based Row Sources;" and U.S. patent application Ser. No. 12/474,133 filed on May 28, 2009 entitled "Efficient Way To Evaluate Aggregations On XML Data Using Path-Based Row Sources;" and U.S. patent application Ser. No. 12/467,984 filed on May 18, 2009 entitled "Efficient Way to Evaluate Uncorrelated Path-Based Row Sources With XML Storage." The contents of all patent applications cited in this paragraph are incorporated by reference.

FIELD OF THE INVENTION

The techniques presented herein are directed towards storing XML data in a relational database, and querying the data in an efficient way.

XML Documents

XML (eXtensible Markup Language) is becoming increasingly popular as the format for describing and storing all forms of data. Thus, providing support for storing, searching, and manipulating XML documents is an extremely important problem for data management systems today.

Because of the popularity of XML as a data exchange format that supports hierarchical relationships among elements, and because of the power of relational data management systems (DBMS) to update and retrieve data, there is a demand for storing XML data into relational databases and querying XML data from relational databases using native XML query constructs.

Querying XML Data Stored in an Object-Relational Database

When XML data is stored in an object-relational database, there are several choices about how the XML data is stored and how users express queries to retrieve the data. Users often find it convenient to use XQuery expressions to query for XML data, relying on the database management system to translate the XQuery expressions into SQL statements that are optimized for the database system. XQuery 1.0 was developed by the XML Query working group of the W3C, and became a W3C recommendation in January 2007. The translation from XQuery to SQL and the optimization of the SQL depends on several factors including the nature of the XQuery and how the XML data is stored in the database.

XPath Expressions

XPath is a language for addressing XML documents that operates on the abstract, logical structure of an XML document, rather than its surface syntax. XPath gets its name from its use of a path notation, as in URLs, for navigating through the hierarchical structure of an XML document. The XPath data model is described in detail in Section 5 ("Data Model") of "XML Path Language (XPath)" (version 1.0), a W3C (World Wide Web Consortium) Recommendation dated 16 Nov. 1999.

The primary syntactic construct in XPath is the expression. XPath expressions are described in Section 3 ("Expressions") of "XML Path Language (XPath)" (version 1.0). One important kind of expression is a location path which indicates a set of nodes relative to a context node. The semantics of location paths are described in Section 2 ("Location Paths") of "XML Path Language (XPath)" (version 1.0).

XPath is a subset of XQuery. That is, an XPath expression is also an XQuery expression. However, XQuery also has programming constructs in addition to XPath expressions.

Binary XML

The size of individual XML documents has been growing. XML documents can be as large as multi-megabytes and are expected to grow significantly over time. Binary XML is a compact binary representation of XML that was designed to reduce the size of XML documents and is one format in which XML data can be stored in a database. Binary XML reduces the overall size of the XML document. In addition, sending a binary-encoded XML document over the network requires fewer bytes to be transmitted, thus consuming less network bandwidth.

However, Binary XML requires more processing time to query and manipulate. The binary encoding must be decoded in order to interpret the document. Thus, each time an XPath expression is evaluated over binary XML, additional computation is necessary over what would be required when simply operating on an in-memory tree-representation or even a textual representation of the document. Techniques are needed to increase the performance of querying binary-encoded XML data stored in an object-relational database while keeping the benefits that the database management system provides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a diagram showing a simplified SQL query that is a rewrite of an example XQuery expression.

FIG. 4 is a diagram showing a rewritten SQL Query that highlights the elimination of a path-based query operator through the use of a path-based query operator with enhanced syntax.

DETAILED DESCRIPTION

Figure 1:
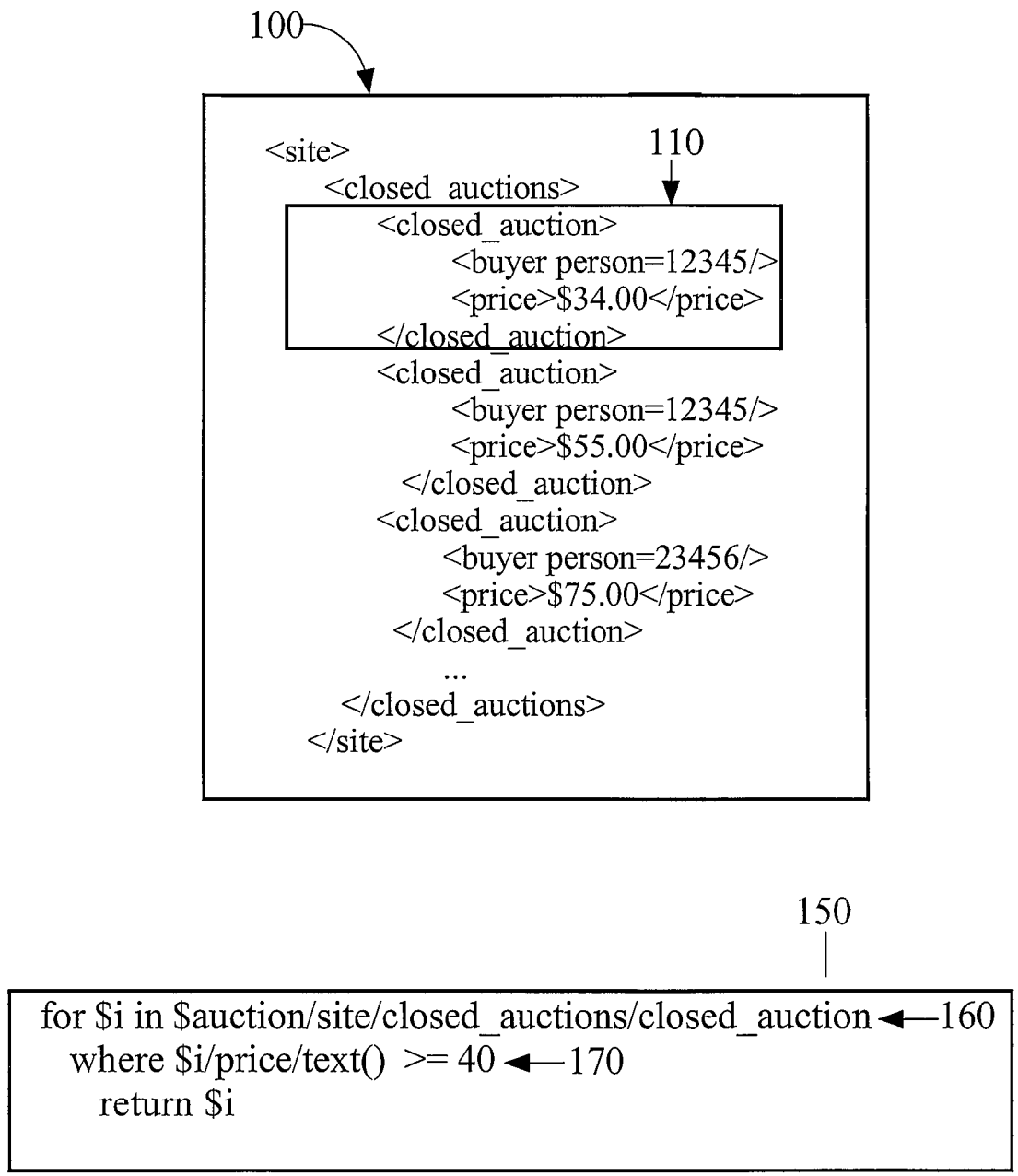
FIG. 1 is an example XML document and an example XQuery expression that takes the XML document as input.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The approaches described herein provide an efficient way for a database server to process certain kinds of queries that require the evaluation of a predicate expression over XML data stored in an object-relational database. A predicate expression comprises a unary or binary operator taking one or two operands respectively and returning a boolean value (TRUE or FALSE). When the value of a predicate expression evaluates to TRUE, the predicate is "satisfied," and a row may be generated. Thus, a predicate expression may also be called a "row condition." A predicate expression over XML data has at least one operand that is a path-based expression. Thus, such a predicate expression over XML data requires evaluating the path-based expression as the predicate operand, and the predicate operator operates on the predicate operand. Operators used in a predicate expression include the following arithmetic and boolean operators:

| | |
|---|---|
| = | Equal |
| <> | Not equal |
| > | Greater than |
| < | Less than |
| >= | Greater than or equal |
| <= | Less than or equal |
| AND | Logical and |
| OR | Logical or |
| NOT | Logical not (unary) |

A database server first determines whether a query containing a predicate expression with a path-based operand qualifies for a particular optimization described herein. When the query qualifies for optimization, the database server rewrites the query using an enhanced path-based query operator. The enhanced path-based query operator takes as arguments the predicate operators and operands. The semantics of the enhanced path-based query operator is that only those rows for which the row filter condition is satisfied are generated.

XQuery

XQuery is used to query collections of XML data. It is semantically similar to SQL. The SQL/XML committee has decided to accept the XQuery data model for the XMLType data type. When XML data is stored in a database, a user may retrieve the XML data by writing XQuery expressions.

XQuery uses XPath expression syntax to address specific parts of an XML document. XQuery supplements the XPath expression syntax with SQL-like "FLWOR expressions." A FLWOR expression is constructed from the five clauses after which it is named: FOR, LET, WHERE, ORDER BY, RETURN. The FOR clause is a looping construct as in many programming languages and provides the ability to iterate over a set of operations. FOR clauses may be nested; that is, one FOR clause may be located within another FOR clause.

The FOR clause generates a set of XML nodes corresponding to the evaluation of the XPath expression. The WHERE clause contains a predicate expression that filters the set of nodes generated in the FOR clause. The predicate expression may contain an XPath expression.

XQuery Example

FIG. 1 shows an example XQuery expression 150 that operates on the XML Document, 100. The entire document 100 is stored as Binary XML in an XMLType column of an object-relational database table. This relational table is called the "base table" for the XQuery. Document 100 records the dollar amount of items purchased by individual buyers at auction. Each <closed_auction> node contains two nodes: <buyer> and <price>. The <closed_auction> node 110 contains a buyer containing a person attribute with a value of "12345," and the contents of the <price> node is $34.00. The XQuery expression 150, returns the <closed_auction> nodes where the price is at least $40.00. $34.00 is not more than $40.00, and thus <closed_auction> node 110 does not appear in the output of this XQuery expression. However, the other <closed_auction> nodes in the base table document have prices of $55.00 and $75.00, and thus, both of these nodes appear in the query output.

The XQuery expression 150, has a FOR loop 160 (more generally referred to as an "iteration expression") that iterates over the 3 nodes rooted at an instance of <closed_auctions>. In order to determine whether a <closed_auction> node should be included in an output row, the predicate expression 170 must be evaluated ($i/price/text( )>40). From each <closed_auction> node, the price node must be found, its value extracted and compared against 40. If the predicate expression is satisfied, then the <closed_auction> node is included in the query results.

Query Rewrite and Optimization

When a database system receives an XQuery expression for retrieving XML data stored within the database, the database system performs a series of steps of translation, rewriting, and optimization before executing the query. Each step of query transformation may result in a re-formed text-based representation of the query. Alternatively, the database system may represent the transformed query as in-memory data structures at one or more steps of query transformation.

The next sections describe query transformations that are relevant to the techniques described herein.

XQuery to SQL Translation

An XQuery expression is re-written in terms of XML-aware SQL constructs before the expression can be computed. Relational databases operate on rows and columns, and thus, XQuery expressions must be translated into SQL operations that can operate on binary encoded XML data and create a row comprising columns of XMLType data and scalar values.

Each XQuery FLOWR expression is re-written as an XML-aware query operator, such as the XPATHTABLE query operator used by Oracle. The XML-aware query operator specifies the driving XPath expression (also shortened to "driving XPath") whose evaluation will determine the cardinality and contents of a set of rows. Each result of the driving XPath expression evaluation may create one row. The XML-aware query operator may also specify an XPath expression corresponding to each of the columns in the row. To generate the value of a column, the XPath expression corresponding to the column is evaluated on the results from evaluating the driving XPath expression for this row.

From the XQuery example shown above, two XML-aware query operators are generated at XQuery rewrite time. FIG. 2 shows a simplified example of unoptimized XML-aware SQL generated for the XQuery example using the query operator XPATHTABLE. One path-based query operator 220 corresponds to the XQuery FLOWR expression 160 and the other path-based query operator 210 corresponds to the driving XPath of the path-based predicate expression 170 in the WHERE clause. There is an additional operator 230 for evaluating the predicate expression.

The XPATHTABLE query operator 220 specifies a driving XPath expression of "$auction/site/closed_auctions/closed_auction" to get a list of the <closed_auction> nodes. Query operator 210 specifies a driving XPath expression of "closed_auction/price/" to retrieve the price paid in the auction corresponding to the <closed_auction> nodes. "text( )" extracts the value paid at auction from the price node. Operator 230 may evaluate the predicate expression (>40) because the price value is scalar.

Recognizing Query Optimization Candidates

Once an XQuery expression is re-written into XML-aware SQL constructs, a database server optimizes the query and generates an execution plan. Optimization may require analysis of the relationships among the XML-aware query operators. In one embodiment, recognizing that an optimization is possible requires evaluating two criteria. The first criterion requires that data available to one of the path-based query operators is sufficient to supply the input to the other path-based query operator. The input to a path-based query operator is called the driving operand. The input to a path-based query operator is found in the PASSING expression. Thus, the driving operand of query operator 220 is XMARK.XML-DATA, which refers to a column of XML data. The driving operand of path-based query operator 210 is P.C0, which is provided by path-based query operator 220 as "site/closed_auctions/closed_auction." The first criterion is whether the driving operand to the second path-based operator is either based on the same driving operand as the first path-based query operator or based on the output of the first path-based query operator. In the example in FIG. 2, the driving operand of path-based query operator 210 is based on the output of the path-based query operator 220. If two path-based query operators are so related, then the first path-based query operator contains all the data necessary to compute the XPath expressions required by the second path-based query operator. The XPath expressions computed by the second path-based query operator can be computed instead by the first path-based query operator and stored in columns of the rows generated by the first path-based query operator.

A second criterion for performing the optimization is that the second path-based query operator computes one or more path-based predicate operands (e.g. P1.C0), and the results from computing the driving XPath for the second path-based query operator are not returned as the result for the query (e.g. P.C0). In one embodiment, the driving XPath for the second path-based query operator is computed for no other purpose than to compute one or more predicate operands for use in evaluating the row filter condition. In the example, P1 is only referenced by the predicate expression. The value of the XPath expression itself need not be stored or returned in the query results. In the XQuery example, the query results are entire <closed_auction> nodes that satisfy the row filter condition, and thus, the values of the driving XPath for the second path-based query operator are not needed in the output rows. In other words, the entire query output is generated by the first path-based query operator, and the second path-based query operator only serves to filter the output. The second path-based query operator generates no new data to be returned from the query.

When both criteria are met, then the second path-based query operator is a candidate for elimination through the optimization described herein. For the example SQL shown in FIG. 2, both criteria are met, and thus, the example SQL may be optimized by the technique described herein.

Rewriting SQL Queries to Eliminate Path-Based Query Operators

In one embodiment, the optimization depends upon enhancing the syntax of a path-based query operator. This example query can be optimized by re-writing the first path-based query operator to include an additional column with a new type "PREDICATE" where the value of the column is defined by the predicate operator and operands. The semantics of the enhanced path-based query operator is that the enhanced path-based query operator evaluates the predicate expression, and only rows that satisfy the row filter condition are generated. Thus, an enhanced first path-based query operator can perform all the functions that would otherwise require three query operators in an un-optimized query.

Figure 3:
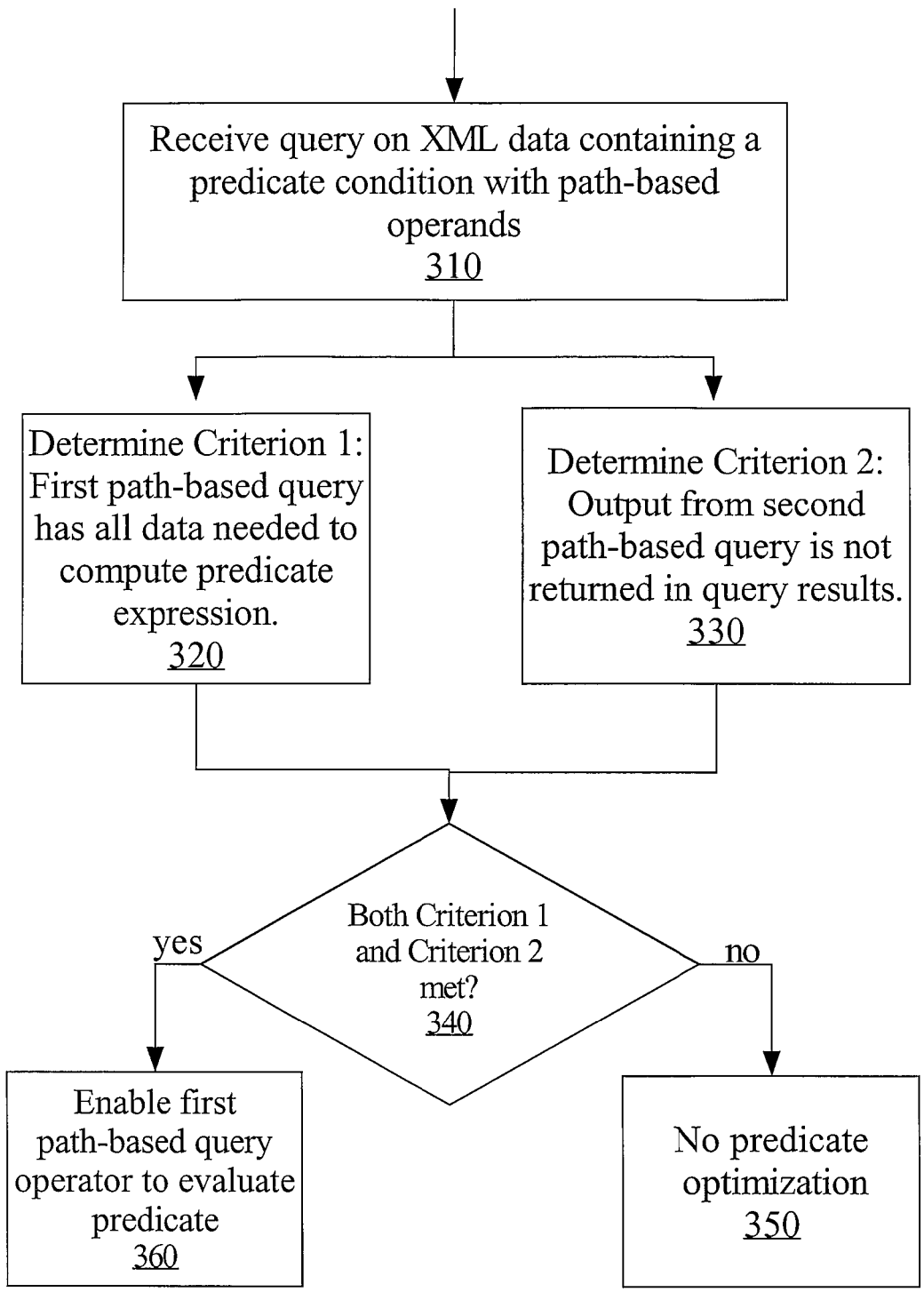
FIG. 3 is a flow diagram showing the analysis of an XQuery expression to determine whether a predicate-based optimization can be made.

The optimization can be recognized at query rewrite time. FIG. 3 shows the steps during query compilation for recognizing that the optimization may be used to enhance a path-based query operator to evaluate a predicate expression. In Step 310, the database server receives a query for retrieving XML data, and the query contains a predicate expression that includes one or more path-based predicate operands. In Step 320, the query is analyzed to determine whether the driving XPath specified in the second path-based query operator can be evaluated using data available to the first path-based query operator. In Step 330, the query is analyzed to determine whether output generated from the second path-based query operator appears in the query results. Steps 320 and 330 are independent of each other and may be performed in either order or concurrently. In Step 340, the database server determines whether both criteria are met for performing the optimization. If either Criterion 1 or Criterion 2 is not met, then in Step 350, this query is determined not to be a candidate for this particular predicate-based optimization. If both Criterion 1 and Criterion 2 are met, then in Step 360, the first path-based query operator is enabled to subsume the second path-based query operator, including the computation of the predicate expression.

FIG. 4 shows a simplified example of XML-aware SQL generated for the XQuery example using the query operator XPATHTABLE after the optimization has been applied. There are several differences between the optimized XML-aware SQL in FIG. 4 and the non-optimized version shown in FIG. 2. First, in FIG. 4, there is only one XPATHTABLE 410, not two, as in FIG. 2 (210 and 220). Second, an additional column is included in the arguments to the XPATHTABLE. The path-based query operator column syntax is modified to accept an additional "PREDICATE" type argument 420 that specifies the row filter condition to apply to the rows before the rows are output. There may be a single column of type PREDICATE, and the predicate expression may be complex, with references to more than one path-based predicate operand.

Query Execution Optimizations

The outcome of query optimization is a query execution plan. The query execution plan provides the instructions to the SQL engine as to the sequence of function calls and their parameters. The enhanced XML-aware query operator described above will be used as input to the construction of the query execution plan to parameterize an XPath row source that the SQL engine will invoke at run time.

A row source is a function which, when invoked by the SQL engine, produces a set of rows. A path-based row source is a row source that produces rows, with each row having a number of columns and each column generated by evaluating one or more path expressions such as XPath. (An XPath row source is a path-based row source that evaluates XPath expressions). A path-based row source generates a row containing XMLType data and can operate on XML data, and in particular, binary-encoded XML data.

An XML-aware query operator at least partially specifies the parameters to an XPath row source. An example of an XPath row source is Oracle's XPATHTABLE row source. Oracle's XPATHTABLE query operator is an SQL language construct that is used as an intermediate result during query evaluation. The path-based query operators specify some of the information that will be used when parameterizing the XPath row source, which is a run-time function. The XPath row source is included in the query execution plan.

In addition to the cost savings associated with initializing and calling only one path-based row source rather than two or more, there are several other ways in which using an enhanced path-based query operator to specify predicate evaluation leads to optimized query execution. If there is more than one predicate operand, the system may use statistics to determine which predicate operand to evaluate first to minimize the cost of evaluating the predicate expression. As mentioned before, only rows for which the row filter condition is satisfied are generated, and thus the other columns of the row need not be computed if the row is not generated. Thus, the predicate expression may be evaluated before computing other columns in the row that have no role in predicate computation. In that way, if the predicate is not satisfied, the unnecessary work of computing the other columns can be avoided.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of the resources from a node is a server that is referred to herein as a "server instance" or "instance".

XML Storage

Various types of storage mechanisms are used to store a XML document. One type of storage mechanism stores a XML document as a text file in a file system. Another type of mechanism for storing XML documents is a database server. In a database server, a XML document may be stored in a row of a table and nodes of the XML document are stored in separate columns in the row. An entire XML document may also be stored in a lob (large object) in a column. A XML document may also be stored as a hierarchy of objects in a database; each object is an instance of an object class and stores one or more elements of a XML document. Tables and/or objects of a database system that hold XML data are referred to herein as base tables or objects.

Binary-encoded XML is another form in which XML data may be stored in a database. Binary-encoded XML is a compact binary representation of XML that was designed to reduce the size of XML documents. One of the ways binary-encoded XML compresses data is by representing strings ("tokens") with fixed values.

In one implementation of binary-encoded xml, a mapping is established between character strings and replacement values, where the character strings are tag names, and the replacement values are numbers. Such mappings are referred to herein as "translation information".

Database servers that store XML data may include many mechanisms that allow for powerful and efficient ways to query large collections of XML documents. Database servers that store XML documents may be enhanced to efficiently perform XML operations using these mechanisms. A database server may maintain a "logical index", referred to herein as a XML index, that indexes a collection of XML. A logical index contains multiple structures that are cooperatively used to access a collection XML documents. According to an embodiment of the present invention, a logical index includes a path table, which contains information about the hierarchies of nodes in a collection XML documents and may contain the value of the nodes. Among the columns or attributes of the path table is a column that stores the path id of nodes.

When a database server receives a XML query, the database server may rewrite the query to refer to the underlying database structures that store the XML data. Such rewrites may include those described previously, those involving rewriting the query to refer to the data structures (e.g. path table) of the XML index.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
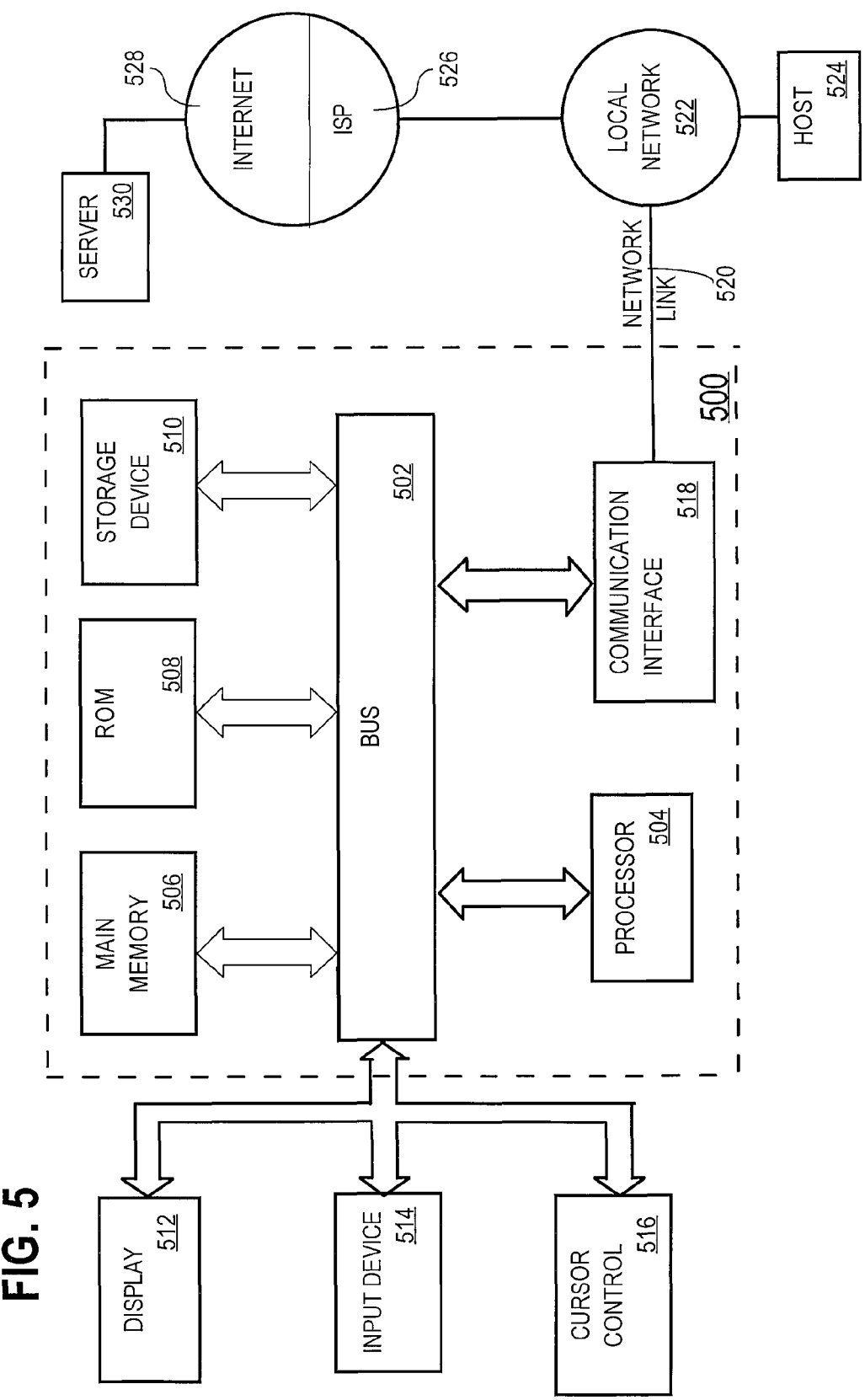
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising steps of:
   receiving a query against a collection of XML documents stored in one or more tables of a database, wherein the query contains a row filter condition;
   determining that the query contains a set of path-based query operators that satisfy a set of criteria, wherein the set of path-based query operators comprises a first path-based query operator and a second path-based query operator;
   wherein satisfying said set of criteria requires that:
   a) the row output from the first path-based query operator is the row input to the second path-based operator;
   b) the row filter condition contains a path-based operand that references the row output from the second path-based query operator; and
   c) the output from the second path-based query operator is not returned in the results for the query;
   in response to determining that the query contains a set of path-based query operators that satisfy the criteria, rewriting the query by eliminating the second path-based query operator and re-writing the first path-based query operator to only return rows that satisfy the row filter condition;
   wherein the method is performed by one or more computing devices.

2. The method of claim 1, wherein satisfying said set of criteria further requires that:
   the output from the second path-based query operator is only referenced by the row filter condition.

3. The method of claim 1, further comprising:
   rewriting the first path-based query operator with a plurality of parameters, wherein one or more parameters of the plurality of parameters specify the row filter condition.

4. The method of claim 1, wherein the value of the path-based operand of the row filter condition is computed by the first path-based query operator and placed in a column of the output from the first path-based query operator.

5. The method of claim 1, wherein the row filter condition is evaluated within the first path-based query operator, and only rows that satisfy the row filter condition are returned as output from the first path-based query operator.

6. The method of claim 5, wherein the query is rewritten without an SQL WHERE clause.

7. The method of claim 1, wherein the query is expressed as an XQuery FLOWR expression and rewritten using path-based query operators.

8. The method of claim 1, wherein the query is expressed as an SQL expression including an XMLTABLE expression and rewritten using path-based query operators.

9. The method of claim 1, wherein satisfying said set criteria further requires that the driving operand of the second path-based query operator is based on the driving operand of the first path-based query operator.

10. A machine-readable storage medium storing instructions, wherein the instructions, when executed by one or more processors, cause execution of steps comprising:
    receiving a query against a collection of XML documents stored in one or more tables of a database, wherein the query contains a row filter condition;
    determining that the query contains a set of path-based query operators that satisfy a set of criteria, wherein the set of path-based query operators comprises a first path-based query operator and a second path-based query operator;
    wherein satisfying said set of criteria requires that:
    a) the row output from the first path-based query operator is the row input to the second path-based operator;
    b) the row filter condition contains a path-based operand that references the row output from the second path-based query operator; and
    c) the output from the second path-based query operator is not returned in the results for the query;
    in response to determining that the query contains a set of path-based query operators that satisfy the set of criteria, rewriting the query by eliminating the second path-based query operator and re-writing the first path-based query operator to only return rows that satisfy the row filter condition;
    wherein the method is performed by one or more computing devices.

11. The machine-readable storage medium of claim 10, wherein satisfying said set of criteria further requires that:
    the output from the second path-based query operator is only referenced by the row filter condition.

12. The machine-readable storage medium of claim 10, the steps further comprising:
    rewriting the first path-based query operator with a plurality of parameters, wherein one or more parameters of the plurality of parameters specify the row filter condition.

13. The machine-readable storage medium of claim 10, wherein the value of the path-based operand of the row filter condition is computed by the first path-based query operator and placed in a column of the output from the first path-based query operator.

14. The machine-readable storage medium of claim 10, wherein the row filter condition is evaluated within the first path-based query operator, and only rows that satisfy the row filter condition are returned as output from the first path-based query operator.

15. The machine-readable storage medium of claim 10, wherein the query is rewritten without an SQL WHERE clause.

16. The machine-readable storage medium of claim 10, wherein the query is expressed as an XQuery FLOWR expression and rewritten using path-based query operators.

17. The machine-readable storage medium of claim 10, wherein the query is expressed as an SQL expression including an XMLTABLE expression and rewritten using path-based query operators.

18. The machine-readable storage medium of claim 10, wherein satisfying said set of criteria further requires that the driving operand of the second path-based query operator is based on the driving operand of the first path-based query operator.

* * * * *

UNITED STATES PATENT AND TRADEMARK OFFICE
CERTIFICATE OF CORRECTION

| | | |
|---|---|---|
| PATENT NO. | : 8,161,035 B2 | Page 1 of 1 |
| APPLICATION NO. | : 12/478147 | |
| DATED | : April 17, 2012 | |
| INVENTOR(S) | : Zhang et al. | |

It is certified that error appears in the above-identified patent and that said Letters Patent is hereby corrected as shown below:

On front page, in column 1, under "Assignee", line 1-2, delete "Red Shores, CA" and insert -- Redwood Shores, CA --, therefor.

In column 4, line 53, after XQuery, delete "FLOWR" and insert -- FLWOR --, therefor.

In column 11, line 39, in Claim 1, after "satisfy the" insert -- set of --.

In column 11, line 64, in Claim 7, after XQuery, delete "FLOWR" and insert -- FLWOR --, therefor.

In column 12, line 4, in Claim 9, after "set" insert -- of --.

Signed and Sealed this
Seventeenth Day of July, 2012

David J. Kappos
*Director of the United States Patent and Trademark Office*